(12) United States Patent
Chen et al.

(10) Patent No.: US 10,754,648 B2
(45) Date of Patent: Aug. 25, 2020

(54) MICROPROCESSOR WITH CIRCUIT FOR SERIES CALCULATION

(71) Applicant: Shanghai Zhaoxin Semiconductor Co., Ltd., Shanghai (CN)

(72) Inventors: Jing Chen, Beijing (CN); Xiaoyang Li, Beijing (CN); Weilin Wang, Beijing (CN); Jiin Lai, New Taipei (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 131 days.

(21) Appl. No.: 16/027,983

(22) Filed: Jul. 5, 2018

(65) Prior Publication Data
US 2019/0205130 A1 Jul. 4, 2019

(30) Foreign Application Priority Data
Jan. 2, 2018 (CN) .......................... 2018 1 0001411

(51) Int. Cl.
*G06F 9/30* (2018.01)
(52) U.S. Cl.
CPC .......... *G06F 9/3001* (2013.01); *G06F 9/3016* (2013.01)
(58) Field of Classification Search
None
See application file for complete search history.

(56) References Cited

U.S. PATENT DOCUMENTS

| | | | | |
|---|---|---|---|---|
| 7,103,759 B1* | 9/2006 | Blixt | ......................... | G06F 9/24 703/24 |
| 2007/0143577 A1* | 6/2007 | Smith | ................. | G06F 15/7867 712/10 |
| 2014/0379772 A1* | 12/2014 | Hondo | .................... | G06F 7/483 708/495 |
| 2017/0103321 A1* | 4/2017 | Henry | .................... | G06F 9/3867 |
| 2018/0129501 A1* | 5/2018 | Levison | ................. | G06F 9/3861 |

FOREIGN PATENT DOCUMENTS

CN 104169866 A 11/2014

* cited by examiner

*Primary Examiner* — Michael D. Yaary
(74) *Attorney, Agent, or Firm* — McClure, Qualey & Rodack, LLP (57) ABSTRACT

A microprocessor having the capability of executing a micro-instruction for series calculation is provided. The microprocessor includes an instruction decoder and an execution circuit for series calculation. The micro-instruction whose source operands correspond to an undetermined number x and a plurality of coefficients $a_0$ to $a_n$ (for $x^0$ to $x^n$) is decoded by the instruction decoder. Based on x and $a_0$ to $a_n$, the execution circuit for series calculation includes at least one multiplier for calculating exponentiation values of x (e.g. $x^P$), and includes at least one MAU (multiply-and-accumulate unit) for combining x, the exponentiation values of x, and the coefficients $a_0$ to $a_n$ for the series calculation.

20 Claims, 6 Drawing Sheets

MICROPROCESSOR WITH CIRCUIT FOR SERIES CALCULATION

CROSS REFERENCE TO RELATED APPLICATIONS

This Application claims priority of China Patent Application No. 201810001411.0, filed on Jan. 2, 2018, the entirety of which is incorporated by reference herein.

BACKGROUND OF THE INVENTION

Field of the Invention

The present application relates to execution circuits for use in the hardware of a microprocessor.

Description of the Related Art

A microprocessor, such as a central processing unit (CPU), is usually provided with execution units which operate according to micro-instructions or micro-ops or μops. In a microprocessor with a traditional instruction set architecture (for example, an X86 instruction set architecture), a complex macro-instruction is first translated into micro-instructions or μops by an instruction decoder and then randomly issued or dispatched to execution units to be executed. Because the micro-instructions (or μops) that are translated from a complex macro-instruction are out of order, a long time is required to complete the execution of the micro-instructions (or μops) considering the dependencies between the micro-instructions (or μops). The execution efficiency is low. How to build an execution unit (or an execution circuit) capable of efficiently performing complex computations with simple hardware is a major topic in this technical field.

BRIEF SUMMARY OF THE INVENTION

A microprocessor in accordance with an exemplary embodiment of the disclosure for executing a micro-instruction and including an instruction decoder and an execution circuit for series calculation. The instruction decoder decodes the micro-instruction whose source operands correspond to an undetermined number and a plurality of coefficients for different terms of a series. The execution circuit executes a series calculation based on the undetermined number and the plurality of coefficients. The execution circuit has at least one multiplier for calculation of exponentiation values of the undetermined number, and at least one multiply-and-accumulate unit (MAU) combining the coefficients, the undetermined number and the exponentiation values for the series calculation. A hardware solution with lower computation for series calculation is provided. Pipelining operation is implemented by the disclosed simple hardware that is operated according to just a single micro-instruction to highly approximate an activation function used in artificial intelligence.

In an exemplary embodiment, the execution circuit uses multiple stages of logic circuits to implement pipelining operation. A first-stage logic circuit in the execution circuit uses a first multiplier to generate a first exponentiation value of the undetermined number. The first exponentiation value is fed to one of a plurality of multiply-and-accumulate units of a second-stage logic circuit in the execution circuit.

In an exemplary embodiment, the first exponentiation value is fed to a main multiply-and-accumulate unit of the plurality of multiply-and-accumulate units of the second-stage logic circuit. All outputs of all multiply-and-accumulate units of the first-stage logic circuit are fed to the main multiply-and-accumulate unit of the second-stage logic circuit.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Artificial intelligence is a major development in the field of science and technology, which often uses neural networks to form a machine learning framework. Activation functions are used in each layer of a neural network to process the inputs of each layer. Rather than outputting a linear combination of inputs, each layer works as a nonlinear function to transform the inputs. Any function, therefore, can be approximated by the output of each layer of a neural network. In the existing processor for the calculations of neural networks, multiple macro-instructions are required for the calculation of an activation function in general. One macro-instruction is decoded into several micro-instructions. The decoded micro-instructions may be out of order, so a long time is required to complete the execution of the micro-instructions considering the dependencies between the micro-instructions, which is inefficient and usually consumes computational resources. This invention provides a hardware solution with lower computation to highly approximate activation functions.

There are various activation functions. For example, $f(x)=1/(1+e^{-x})$ or $f(x)=\ln(1+e^x)$ can be used as an activation function of a neural network. In this disclosure, a series is used to approximate an activation function. For calculation of the series, an execution circuit is specifically provided in a microprocessor, and an instruction set for operating the execution circuit is introduced.

An activation function can generally be expanded by a Taylor series. For example, an activation function $\ln(1+e^x)$ centered on zero may be expanded as:

$$\ln(2) + \frac{1}{2}x + \frac{1}{8}x^2 - \frac{1}{192}x^4 + \frac{1}{2880}x^6 + \ldots$$

An activation function $1/(1+e^{-x})$ centered on zero may be expanded as:

$$\frac{1}{2} + \frac{1}{4}x - \frac{1}{48}x^3 + \frac{1}{480}x^5 - \frac{17}{80640}x^7 + \ldots$$

An arithmetic series may be simplified to series equations:

$$y = a_0 x^0 + a_1 x + a_2 x^2 + \ldots + a_n x^n, \text{ or}$$

$$y = a_0 + a_1 x + a_2 x^2 + \ldots + a_n x^n$$

Figure 1A:
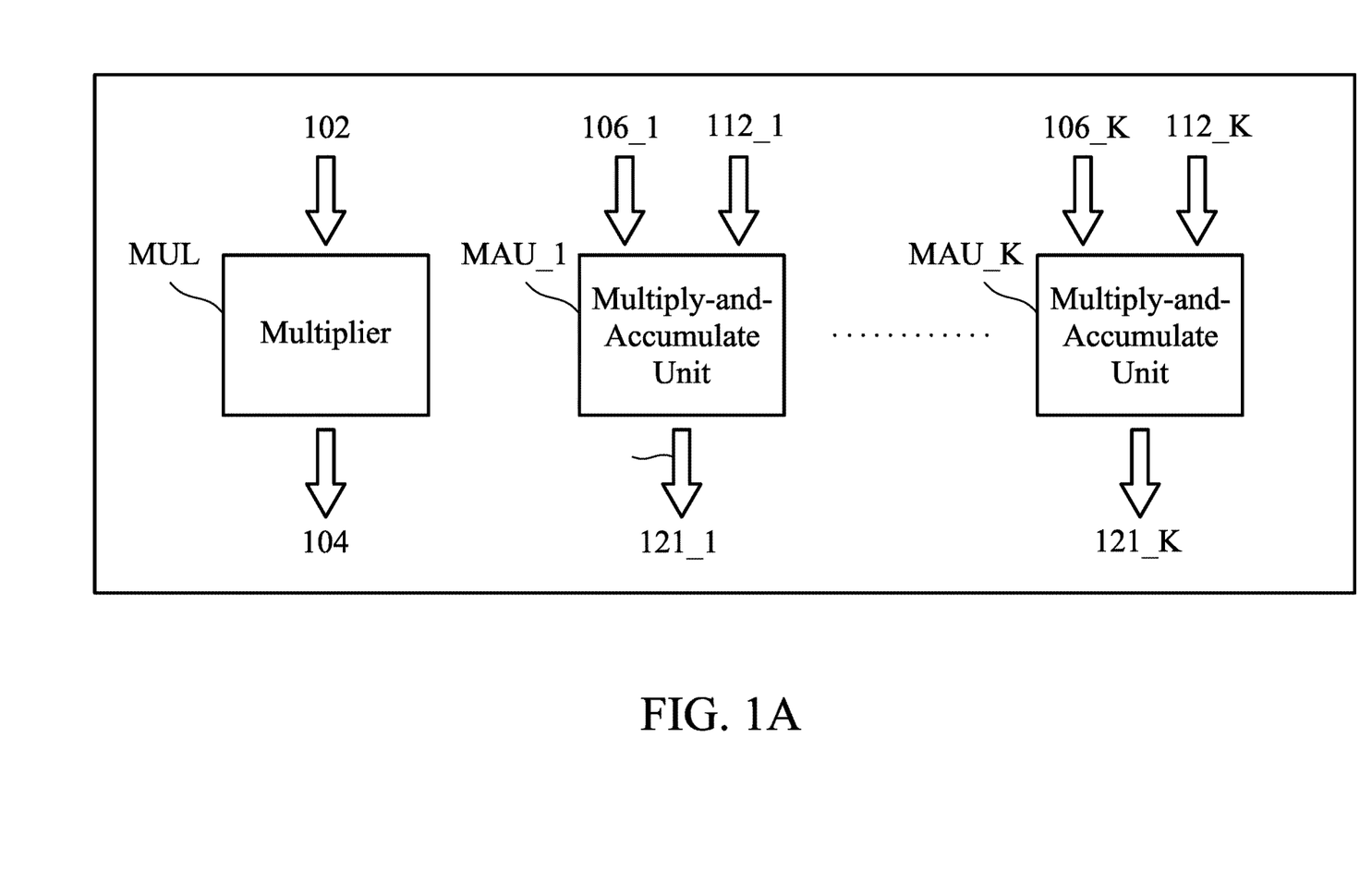
FIG. 1A illustrates a hardware implementation of one logic circuit stage in accordance with an exemplary embodiment of the disclosure, which includes a multiplier MUL and a plurality of multiply-and-accumulate units MAU_1 ... MAU_K.

Various exponentiations of an undetermined number x (i.e., $x_0$ to $x^n$) and coefficients $a_0$ to $a_n$ for different terms (corresponding to $x_0$ to $x^n$) of a series are used to form the series. Multiple stages of logic circuits may be cascaded to implement the calculation of the series. Pipelining operation may be implemented by the multi-stage architecture. FIG. 1A illustrates a hardware implementation of one logic circuit stage in accordance with an exemplary embodiment of the disclosure, which includes a multiplier MUL and a plurality of multiply-and-accumulate units (MAUs) MAU_1 . . . MAU_K.

The multiplier MUL is used to calculate exponentiation value(s) of the undetermined number x. The input 102 may be the undetermined number x itself or a multi-power exponentiation value of the undetermined number x. Via the multiplier MUL, a higher power exponentiation value of the undetermined number x is generated as the output 104. Various exponentiation values of the undetermined number x can be calculated by the multipliers MUL of the different logic circuit stages, which will be used in the subsequent logic circuit stages or is instantly used in the current logic circuit stage.

The multiply-and-accumulate units MAU_1 . . . MAU_K are used to combine the exponentiation values of the undetermined number x with their corresponding coefficients. The first type of input 106_1 . . . 106_K may be exponentiation value(s) of the undetermined number x. In the same layer, the inputs 106_1 . . . 106_K may be different. In an example, the input 106_1 conveys more than one exponentiation value of the undetermined number x to the multiply-and-accumulate unit MAU_1. The second type of input 112_1 . . . 112_K may be coefficients for different terms of a series or output from multiply-and-accumulate units of the previous logic circuit stage. In an example, the input 112_1 of the multiply-and-accumulate unit MAU_1 may convey a plurality of values to the multiply-and-accumulate unit MAU_1 to be paired to the exponentiation values conveyed to the multiply-and-accumulate unit MAU_1 via the input 106_1. After multiplying the plurality of values by the paired exponentiation values, the products are summed up. In an exemplary embodiment of the disclosure, the first signal conveyed to MAU_1 by the input 112_1 is multiplied by a constant 1 (i.e., $x_0$, which is a zeroth power of the undetermined number x) conveyed to MAU_1 by the input 106_1 and then the product participates in the summation. In another exemplary embodiment of the disclosure, the first signal conveyed to MAU_1 by the input 112_1 directly participates in the summation, and the input 106_1 does not contain the constant 1 (i.e., $x^0$). The outputs 121_1 . . . 121_K of the multiply-and-accumulate units MAU_1 . . . MAU_K may be transmitted to the multiply-and-accumulate units of the next logic circuit stage.

Figure 1B:
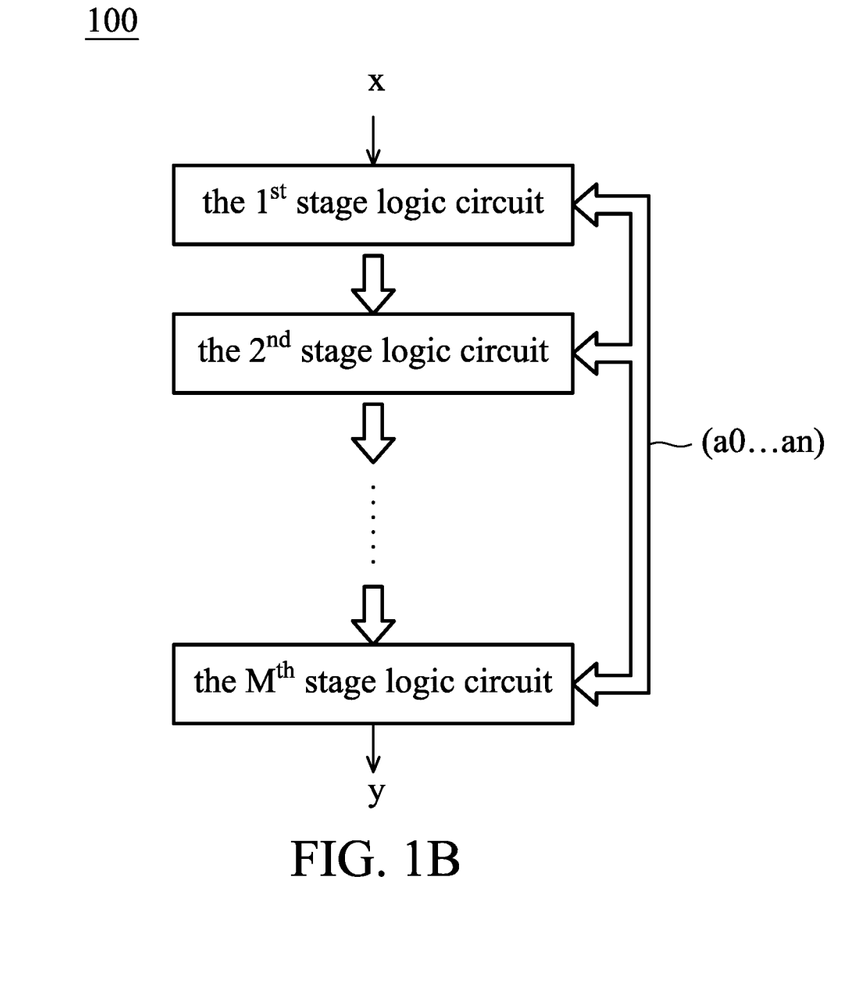
FIG. 1B illustrates an execution circuit 100 for series calculation.

FIG. 1B illustrates an execution circuit 100 for series calculation. As shown, each of the first to the $M_{th}$ logic circuit stages is implemented according to the hardware design shown in FIG. 1A. Based on the undetermined number x input to the first logic circuit stage, the multipliers in the different logic circuit stages may calculate the exponentiation values of the undetermined number x. The coefficients $a_0$ to $a_n$ for different terms of a series (corresponding to $x^0$ to $x^n$) are distributed to the logic circuit stages to be multiplied by the exponentiation values of the undetermined number x. According to the multi-stage design, the calculation result y output from the $M_{th}$ logic circuit stage is:

$$a_0 + a_1 x + a_2 x^2 + \ldots + a_n x^n$$

Some of the logic circuit stages may not include the multiplier for exponentiation calculation of the undetermined number x. Some of the logic circuit stages, e.g. the final stage/the $M_{th}$ logic circuit stage, may include just one single multiply-and-accumulate unit.

In some embodiments, to form the execution circuit 100 (shown in FIG. 1B) for series calculation, each of the M stages may be implemented by one set of logic circuit taught in FIG. 1A and pipelining operation may be implemented. For example, the first logic circuit stage may start to operate on the input for a second series calculation, while a first series calculation proceeds to the second logic circuit stage. Up to M different series calculations may be performed by the execution circuit 100 at the same time. The calculation efficiency is considerably improved. In another exemplary embodiment of the disclosure, only one set of logic hardware (including the multiplier MUL and the multiply-and-accumulate units MAU_1 . . . MAU_K of FIG. 1A) is provided and reused to form the execution circuit 100 having M stages. The multiplier MUL and the multiply-and-accumulate units MAU_1 . . . MAU_K first work as the first logic circuit stage. The generated output 121_1 . . . 121_K, 121_1 . . . 121_K is fed back to the multiply-and-accumulate unit MAU_1 by the input 112_1. Then, the multiplier MUL and the multiply-and-accumulate units MAU_1 . . . MAU_K work again as the second logic stage. This exemplary embodiment results in lower operation efficiency but a smaller circuit area. However, the present invention is not limited to this. Other compromised hardware solutions may be used to implement the execution circuit 100, which are described in detail in the following FIGS. 2 and 3.

Figure 2:
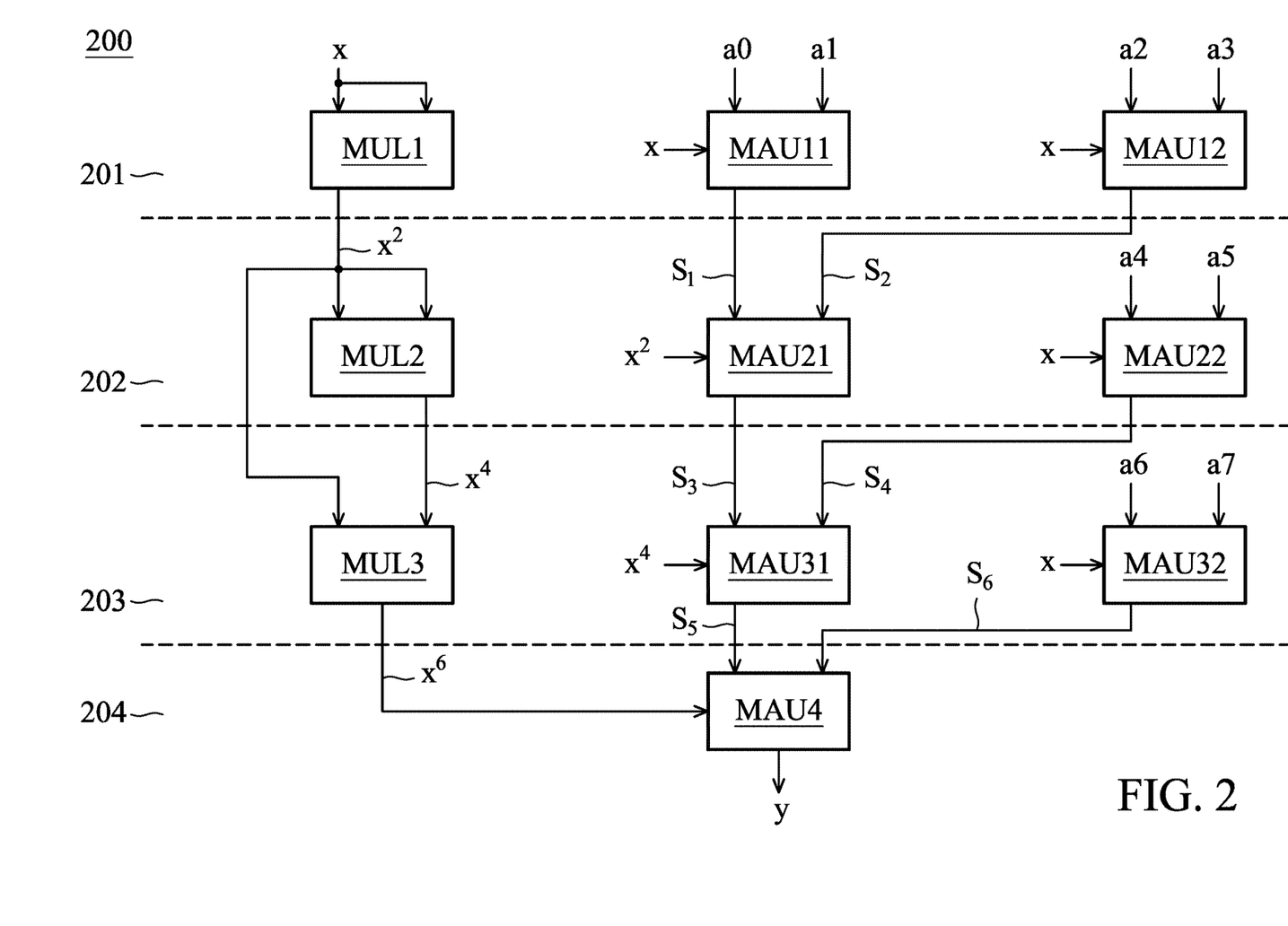
FIG. 2 illustrates an execution circuit 200 for series calculation of a seven-degree equation.

FIG. 2 illustrates an execution circuit 200 for series calculation of a seven-degree equation. The seven-degree equation is:

$$y = a_0 + a_1 x + a_2 x^2 + a_3 x^3 + a_4 x^4 + a_5 x^5 + a_6 x^6 + a_7 x^7$$

Four stages 201, 202, 203 and 204 of logic circuit are used in FIG. 2. The following paragraphs discuss the different logic circuit stages.

The first logic circuit stage 201 includes a multiplier MUL1 and two multiply-and-accumulate units MAU11 and MAU12. The multiplier MUL1 calculates $x^2$, the square of the undetermined number x. The value $x^2$ is transmitted to the subsequent stages. The multiply-and-accumulate unit MAU11 receives the undetermined number x and the coefficients $a_0$ and $a_1$ to calculate $S_1$ ($S_1 = a_0 + a_1 x$). The multiply-and-accumulate unit MAU12 receives the undetermined number x and the coefficients $a_2$ and $a_3$ to calculate $S_2$ ($S_2=a_2+a_3x$). The values $S_1$ and $S_2$ are transmitted to the subsequent stage.

The second logic circuit stage 202 includes a multiplier MUL2 and two multiply-and-accumulate units MAU21 and MAU22. Based on the value $x^2$ (from the multiplier MUL1), the multiplier MUL2 calculates $x^4$, the fourth power of the undetermined number x. The value $x^4$ is transmitted to the subsequent stage. The multiply-and-accumulate unit MAU21 receives the value $x^2$ (from the multiplier MUL1) and the values $S_1$ and $S_2$ (from the multiply-and-accumulate units MAU11 and MAU12, respectively) to calculate $S_3$ ($S_3=S_1+S_2x^2=a_0+a_1x+(a_2+a_3x)x^2=a_0+a_1x+a_2x^2+a_3x^3$). The multiply-and-accumulate unit MAU22 receives the undetermined number x and the coefficients $a_4$ and $a_5$ to calculate $S_4$ ($S_4=a_4+a_5x$). The values $S_3$ and $S_4$ are transmitted to the subsequent stage.

The third logic circuit 203 includes a multiplier MUL3 and two multiply-and-accumulate units MAU31 and MAU22. Based on the value $x^2$ (from the multiplier MUL1) and the value $x^4$ (from the multiplier MUL2), the multiplier MUL3 calculates $x^6$, the sixth power of the undetermined number x. The value $x^6$ is transmitted to the subsequent stage. The multiply-and-accumulate unit MAU31 receives the value $x^4$ (from the multiplier MUL2) and the values $S_3$ and $S_4$ (from the multiply-and-accumulate units MAU21 and MAU22, respectively) to calculate $S_5$ ($S_5=S_3+S_4x^4=a_0+a_1x+a_2x^2+a_3x^3+(a_4+a_5x)x^4=a_0+a_1x+a_2x^2+a_3x^3+a_4x^4+a_5x^5$). The multiply-and-accumulate unit MAU32 receives the undetermined number x and the coefficients $a_6$ and $a_7$ to calculate $S_6$ ($S_6=a_6+a_7x$). The values $S_5$ and $S_6$ are transmitted to the subsequent stage.

The fourth logic circuit stage 204 includes a multiply-and-accumulate unit MAU4 that receives the value $x^6$ (from the multiplier MUL3) and the values $S_5$ and $S_6$ (from the multiply-accumulate units MAU31 and MAU32, respectively) to calculate y ($y=S_5+S_6x^6=a_0+a_1x+a_2x^2+a_3x^3+a_4x^4+a_5x^5+(a_6+a_7x)x^6=a_0+a_1x+a_2x^2+a_3x^3+a_4x^4+a_5x^5+a_6x^6+a_7x^7$).

The execution circuit 200 for series calculation shown in FIG. 2 uses simple hardware (including just multipliers and multiply-and-accumulate units) to build an architecture (including the four logic circuit stages 201 to 204) for pipelining operation. The execution circuit 200 calculates the output y for the seven-degree series ($y=a_0+a_1x+a_2x^2+a_3x^3+a_4x^4+a_5x^5+a_6x^6+a_7x^7$) to approximate an activation function used in neural network, beneficial to apply artificial intelligence by a microprocessor. In an exemplary embodiment, to form the execution circuit 200 for series calculation, the four stages are implemented by four sets of logic hardware to implement pipelining operation. For example, when a first series calculation (e.g., for calculating y) proceeds to the second logic circuit stage 202, the first logic circuit stage 201 may start to operate according to the input of a second series calculation (e.g., for calculating y'). Up to four different series calculations may be performed by the execution circuit 200 at the same time. The calculation efficiency is considerably improved. In another exemplary embodiment of the disclosure, only one set of logic hardware (including the multiplier MUL1 and the multiply-and-accumulate units MAU_11 and MAU_12) is provided and reused to form the execution circuit 200 having four stages. In the first clock cycle, the multiplier MUL1 calculates $x^2$ and the multiply-and-accumulate units MAU_11 and MAU_12 calculate $S_1$ and $S_2$. In the second clock cycle, the value $x^2$ is fed back to the multiplier MUL1 and the fourth power $x^4$ of the undetermined number x is calculated, the values $S_1$ and $S_2$ are fed back to the multiply-and-accumulate unit MAU_11, and the second calculation stage is performed. This exemplary embodiment results in lower operation efficiency but a smaller circuit area. However, the present invention is not limited to this. There are other compromised hardware solutions (e.g., using two sets of logic hardware to implement the four calculation stages).

It should be noted that the series calculation circuit is not limited to the four calculation stages (corresponding to 201 to 204) shown in FIG. 2. Depending on the accuracy demanded, an activation function may be approximated more accurately by a higher-degree equation, e.g., $y=a_0+a_1x+a_2x^2+a_3x^3+a_4x^4+a_5x^5+a_6x^6+a_7x^7+a_8x^8+a_9x^9+a_{10}x^{10}+a_{11}x^{11}$. Piplining operation may be also implemented by an execution circuit similar to the execution circuit 200 of FIG. 2. In comparison with the fourth logic circuit stage 204, a multiplier MUL4 for calculation of $x^8$, the eighth power of the undetermined number x, and another multiply-and-accumulate unit MAU_42 for calculation of $S_8$ ($S_8=a_8+a_9x$) are further provided. Subsequent to the fourth logic circuit stage are the fifth and the sixth logic circuit stages (similar to the hardware implementing the third and the fourth logic circuit stages 203 and 204). In the fifth logic circuit stage, $x^{10}$, the tenth power of the undetermined number x, a value $S_9$ ($S_9=S_7+S_8x^8$), and a value $S_{10}$ ($S_{10}=a_{10}+a_{11}x$) are calculated. In the sixth logic circuit stage, a value $y$ ($y=S_9+S_{10}x^{10}$) is calculated.

Figure 3:
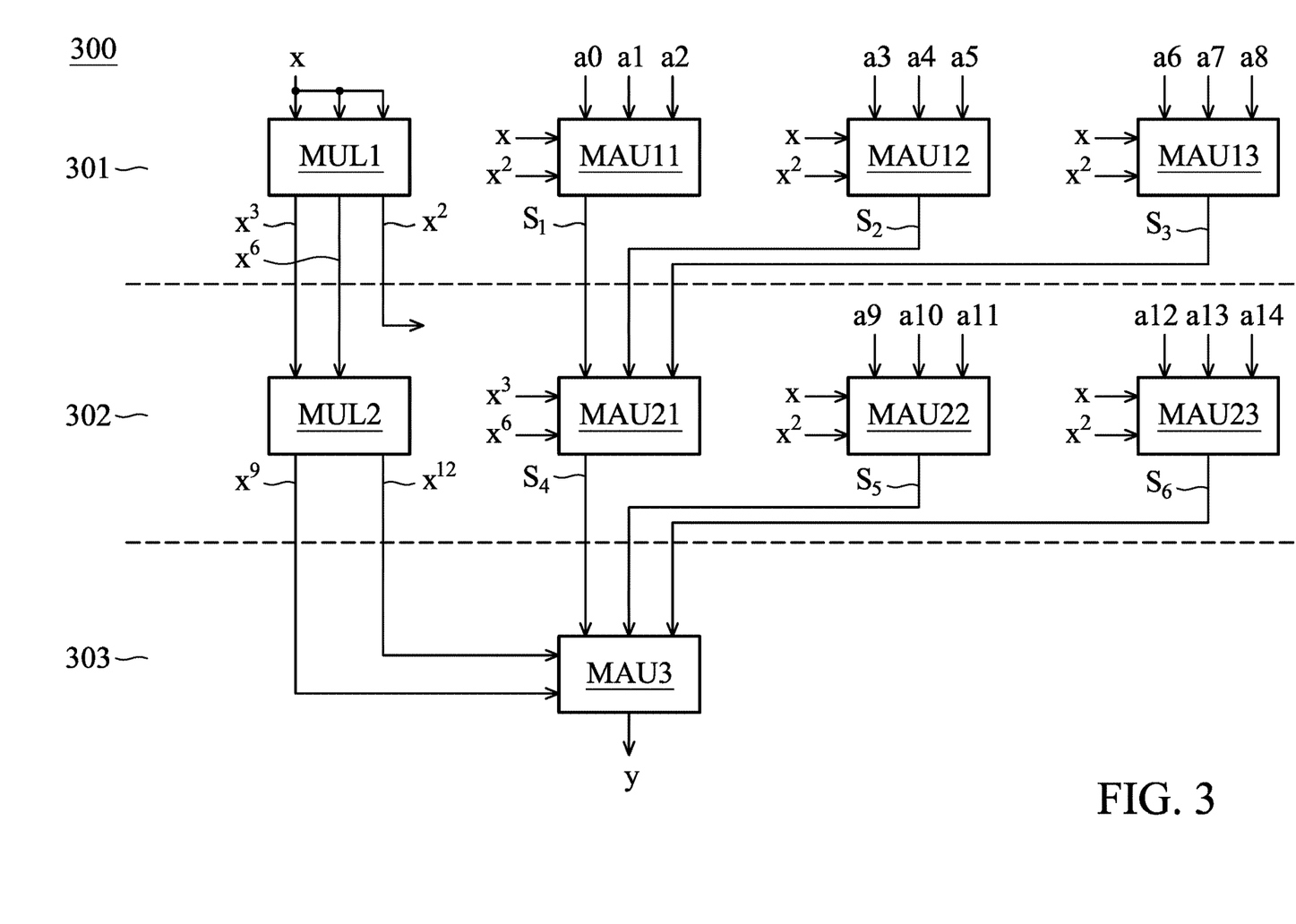
FIG. 3 illustrates an execution circuit 300 for series calculation of a fourteen-degree equation.

All of the multiply-and-accumulate units used in the execution circuit 200 for series calculation in FIG. 2 are simple hardware, each adds just two products. However, the present invention is not limited to this, and a more complicated multiply-and-accumulate unit may be used. FIG. 3 illustrates an execution circuit 300 for series calculation of a fourteen-degree equation. The fourteen-degree equation is:

$$y=a_0+a_1x+a_2x^2+\ldots+a_{14}x^{14}$$

Three stages 301, 302 and 303 of logic circuit are used in FIG. 3. The following paragraphs discuss the different logic circuit stages.

The first logic circuit stage 301 includes a multiplier MUL1 and three multiply-and-accumulate units MAU11, MAU12 and MAU13. The multiplier MUL1 calculates $x^2$, $x^3$ and $x^6$, the undetermined number x to the power of different values. The values $x^2$, $x^3$ and $x^6$ may be transmitted to the subsequent stages or instantly used in the current stage. The multiply-and-accumulate unit MAU11 receives the undetermined number x, the value $x^2$, and the coefficients $a_0$, $a_1$, and $a_2$ to calculate $S_1$ ($=a_0+a_1x+a_2x^2$). The multiply-and-accumulate unit 12 receives the undetermined number x, the value $x^2$, and the coefficients $a_3$, $a_4$, and $a_5$ to calculate $S_2$ ($=a_3+a_4x+a_5x^2$). The multiply-and-accumulate unit MAU13 receives the undetermined number x, the value $x^2$, and the coefficients $a_6$, $a_7$, and $a_8$ to calculate $S_3$ ($=a_6+a_7x+a_8x^2$). The values $S_1$, $S_2$ and $S_3$ are transmitted to the subsequent stage.

The second logic circuit stage 302 includes a multiplier MUL2 and three multiply-and-accumulate units MAU21, MAU22 and MAU23. Based on the values $x^3$ and $x^6$ (from the multiplier MUL1 of the first logic circuit stage 301), the multiplier MUL2 calculates $x^9$ and $x^{12}$ to be transmitted to the subsequent stage. The multiply-and-accumulate unit MAU21 receives the values $x^3$ and $x^6$ (from the multiplier MUL1 of the first logic circuit stage 301) and the values $S_1$, $S_2$ and $S_3$ (from the multiply-and-accumulate units MAU11, MAU12 and MAU13 of the first stage 301) to calculate $S_4$ ($S_4=S_1+S_2x^3+S_3x^6=(a_0+a_1x+a_2x^2)+(a_3+a_4x+a_5^2x)x^3+(a_6+a_7x+a_8x^2)x^6=a_0+a_1x+a_2x^2+a_3x^3+a_4x^4+a_5x^5+a_6x^6+a_7x^7+$ $a_8x^8$). The multiply-and-accumulate unit MAU22 receives undetermined number x and $x^2$ and the coefficients $a_9$, $a_{10}$, and $a_{11}$ to calculate $S_5$ ($S_5=a_9+a_{10}x+a_{11}x^2$). The multiply-and-accumulate unit MAU23 receives undetermined number x and $x^2$ and the coefficients $a_{12}$, $a_{13}$, and $a_{14}$ to calculate $S_6$ ($S_6=a_{12}+a_{13}x+a_{14}x^2$). The values $S_4$, $S_5$ and $S_6$ are transmitted to the subsequent stage.

The third logic circuit stage 303 includes a multiply-and-accumulate unit MAU3 that receives the values $x^9$ and $x^{12}$ (from the multiplier MUL2 of the second logic circuit stage 302) and the values $S_4$, $S_5$ and $S_6$ (from the multiply-and-accumulate units MAU21, MAU22 and MAU23 of the second logic circuit stage 302) to calculate a value y ($y=S_4+S_5x^9+S_6x^{12}=(a_0+a_1x+a_2x^2+a_{23l\ x}^{\ 3}+a_4x^4+a_5x^5+a_6x^6+a_7x^7+a_8x^8)+(a_9+a_{10}x+a_{11}x^2)x^9+(a_{12}+a_{13}x+a_{14}x^2)x^{12}=a_0+a_1x+a_2x^2+a_3x^3+a_4x^4+a_5x^5+a_6x^6+a_7x^7+a_8x^8a_9x^9+a_{10}x^{10}+a_{11}x^{11}+a_{12}x^{12}+a_{13}x^{13}+a_{14}x^{14}$.

The execution circuit 300 for series calculation also uses simple hardware to implement pipelining operation, which highly approximates activation functions used in neural network and facilitates the implementation of artificial intelligence technologies on microprocessors. In comparison with the multiply-and-accumulate units used in the execution circuit 200 for series calculation (shown in FIG. 2), the multiply-and-accumulate units MAU11~MAU13, MAU21~MAU23, and MAU3 of the execution circuit 300 for series calculation (shown in FIG. 3) are more complex. In FIG. 3, each of the multiply-and-accumulate units is provided to perform a calculation, $S=a+bx^p+cx^q$. The hardware circuit is more complex but the execution efficiency of instructions is higher.

As described above, in an embodiment, the three logic circuit stages 301-303 of the execution circuit 300 for series calculation are realized by three sets of logic hardware, beneficial the implementation of pipelining operation. For example, when a first series calculation (for calculating y) proceeds to the second logic circuit stage 302, the first logic circuit stage 301 may operate according to the input of a second series calculation (for calculating y'). Up to three different series calculations may be performed by the execution circuit 300 at the same time. The calculation efficiency is considerably improved. In another exemplary embodiment of the disclosure, only one set of logic hardware (including the multiplier MUL1 and the multiply-and-accumulate units MAU_11, MAU_12 and MAU_13) is provided and reused to form the execution circuit 300 having three stages. In the first clock cycle, the multiplier MUL1 calculates $x^2$, $x^3$, and $x^6$, and the multiply-and-accumulate units MAU_11, MAU_12, and MAU_13 calculate $S_1$, $S_2$, and $S_3$. In the second clock cycle, the values $x^3$ and $x^6$ are fed back to the multiplier MUL4 and the values $x^9$ and $x^{12}$ are calculated, the values $S_1$, $S_2$ and $S_3$ are fed back to the multiply-and-accumulate unit MAU_11 and the second calculation stage is performed. This exemplary embodiment results in lower operation efficiency but a smaller circuit area. However, the present invention is not limited to this. There are other compromised hardware solutions (e.g., using two sets of logic hardware to implement the three calculation stages).

Referring to the execution circuit 200 for series calculation, the second logic circuit stage 202 uses the multiply-and-accumulate unit MAU_21 to calculate $S_3$ ($S_3=S_1+S_2x^2$), the third logic circuit stage circuit 203 uses the multiply-and-accumulate unit MAU_31 to calculate $S_5$ ($S_5=S_3+S_4x^4$), and the fourth logic circuit stage 204 uses the multiply-and-accumulate unit MAU_4 to calculate y ($y=S_5+S_6x^6$). Starting from the second logic circuit stage, each stage has a main multiply-and-accumulate unit (e.g. MAU21 in the second stage, MAU31 in the third stage, and MAU4 in the fourth stage) that receives the outputs from the previous stage rather than the coefficients $a_0$ to $a_n$. Each main multiply-and-accumulate unit calculates at least a part of series terms.

Referring to the execution circuit 300 for series calculation, the second logic circuit stage 302 uses the multiply-and-accumulate unit MAU_21 to calculate $S_4$ ($S_4=S_1+S_2x^3+S_3x^6$), the third logic circuit 303 uses the multiply-and-accumulate unit MAU_3 to calculate y ($y=S_4+S_5x^9+S_6x^{12}$). Starting from the second stage, each stage has a main multiply-and-accumulate unit (e.g. MAU21 in the second stage, MAU3 in the third stage) that receives the outputs from the previous stage rather than the coefficients $a_0$ to $a_n$. Each main multiply-and-accumulate unit calculates at least a part of series terms.

Figure 4:
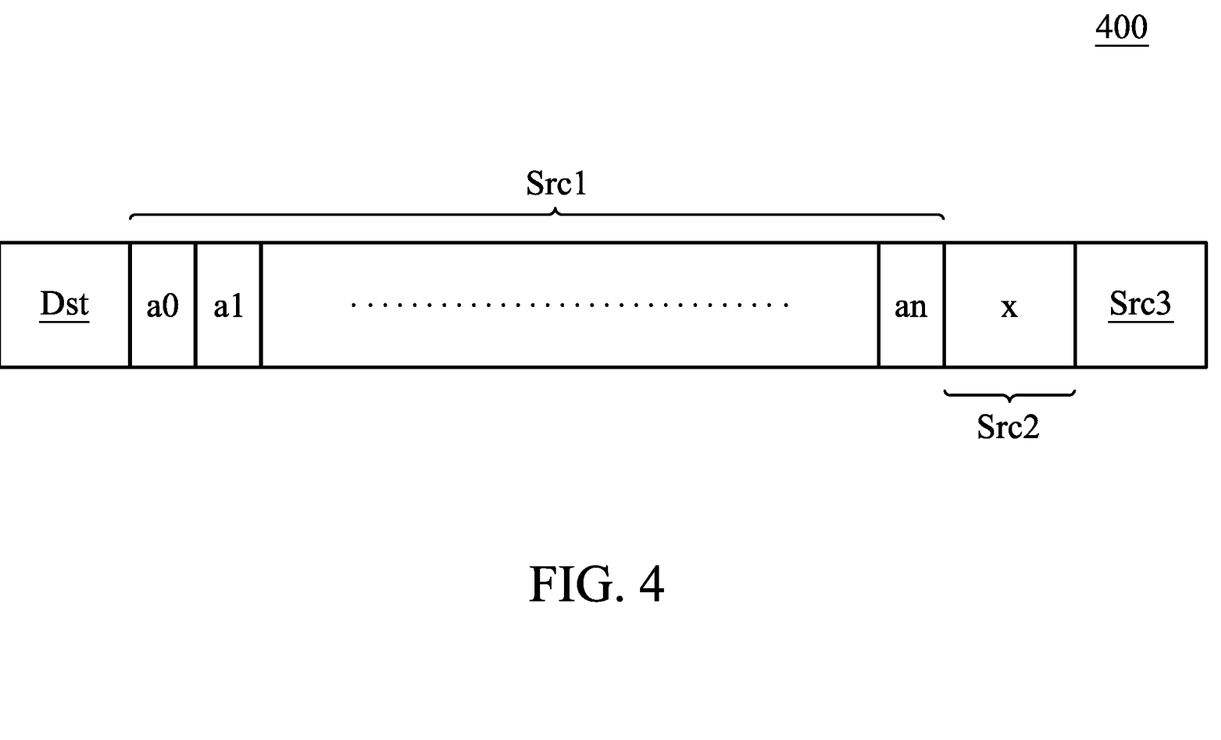
FIG. 4 depicts an instruction format 400 in accordance with an exemplary embodiment of the disclosure.

FIG. 4 depicts an instruction format 400 in accordance with an exemplary embodiment of the disclosure. The execution circuit 100 for series calculation operates according to a micro-instruction in the instruction format 400. The 'Dst' field is provided to indicate the destination operand of the micro-instruction, for outputting the result of the series calculation. The 'Dst' field may be used in storing the calculated result y. The 'Dst' field may indicate an address to store the calculated result y in a register or a memory based on the indicated address. The 'Src1' field is provided to indicate the first source operand of the micro-instruction, for inputting the coefficients ($a_0$ ... $a_n$). The coefficients ($a_0$ ... $a_n$) may be directly written to the 'Src1' field. In other exemplary embodiments, the 'Src1' field may indicate addresses of a register or a memory storing the coefficients ($a_0$ ... $a_n$). The 'Src2' field is provided to indicate the second source of the micro-instruction, for inputting the undetermined number x. The undetermined number x may be directly written to the 'Src2' field. In other exemplary embodiments, the 'Src2' field may indicate an address for storing the undetermined number x in a register or a memory. The 'Src3' field is provided to indicate the third source operand of the micro-instruction, for inputting (n+1), which is the amount of coefficients ($a_0$ ... $a_n$). The digital bits in the 'Src1' field are divided according to the number indicated in the 'Src3' field to obtain the coefficients ($a_0$ ... $a_n$). To be applied to operate a microprocessor, a Single Instruction Multiple Data (SIMD) micro-instruction may be provided in the instruction format 400.

Figure 5:
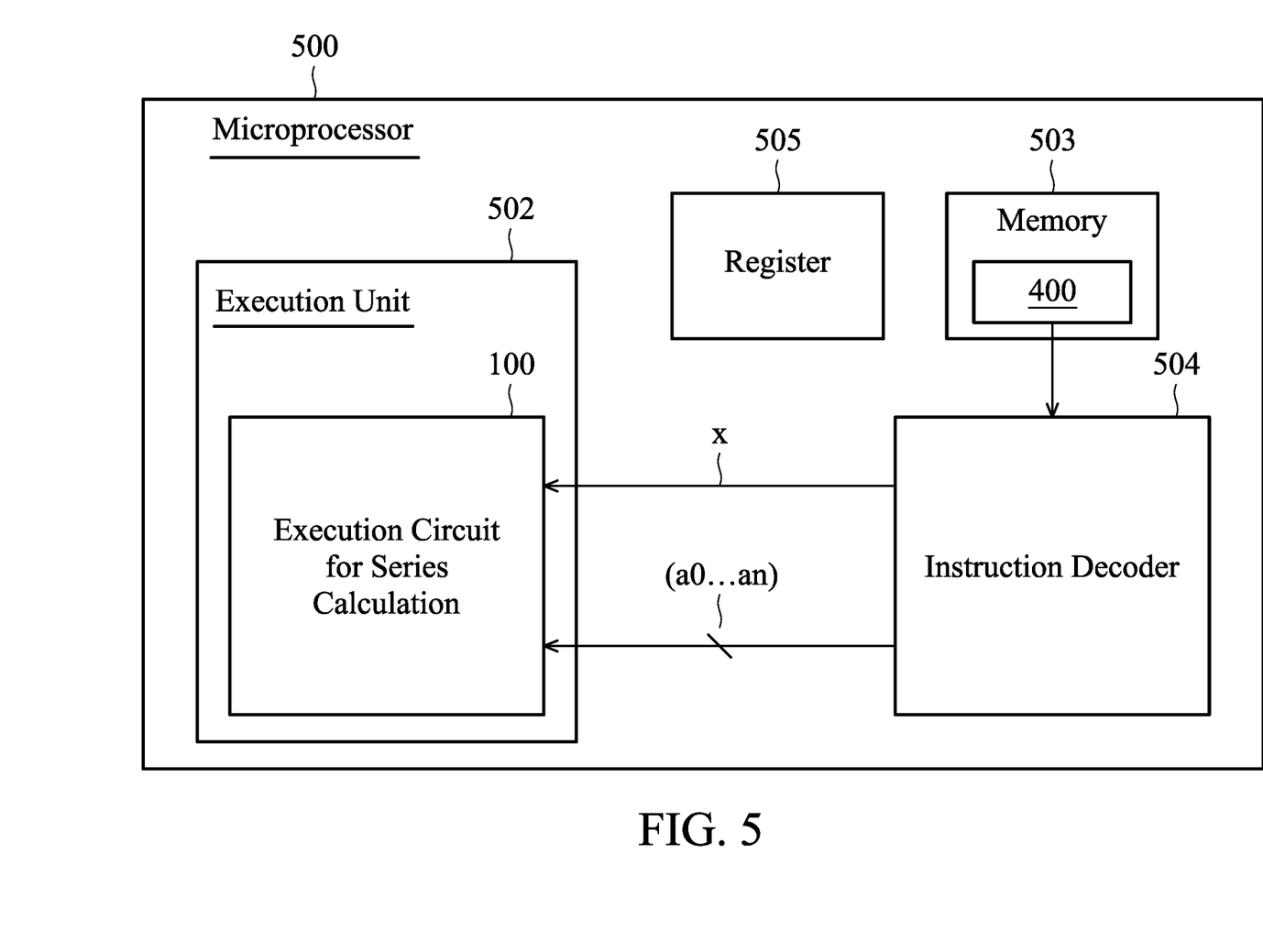
FIG. 5 depicts a microprocessor 500 in accordance with an exemplary embodiment of the disclosure, which includes an execution unit 502 and an instruction decoder 504.

FIG. 5 depicts a microprocessor 500 in accordance with an exemplary embodiment of the disclosure, which includes an execution unit 502 and an instruction decoder 504. The execution unit 502 has the above-described execution circuit 100 for series calculation. The instruction decoder 504 decodes a micro-instruction (e.g. an SIMD micro-instruction) that is in the instruction format 400 to get the source and destination operand information. The undetermined number x and the coefficients ($a_0$ ... $a_n$) indicated in the micro-instruction are input to the execution circuit 100 for series calculation. As shown, the microprocessor 500 further includes a memory 503 and a register 505. The micro-instruction in the instruction format 400 may be translated from a macro-instruction and stored in the memory 503. The undetermined number x and the coefficients ($a_0$ ... $a_n$) may also be stored in the memory 503 or the register 505. The execution circuit 100 for series calculation performs calculation of a series $a_0+a_1x+a_2x^2+$ ... $+a_nx^n$ to get the calculated result y, and involves pipelining operation. The microprocessor 500 may be used to implement an artificial intelligence technology. The execution circuit 100 for series calculation facilitates the implementation of artificial intelligence algorithms (for example, for the calculations of activation functions of a neural network).

The microprocessor 500 may also operate the execution circuit 100 for series calculation required in other applications and is not limited to artificial intelligence technology. Any microprocessor including a hardware structure having an execution circuit 100 for series calculation or operating according to a micro-instruction in the instruction format 400 is within the scope of the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microprocessor, executing a micro-instruction, comprising:
an instruction decoder, decoding the micro-instruction, wherein source operands of the micro-instruction correspond to an undetermined number and a plurality of coefficients for different terms of a series; and
an execution circuit for series calculation, executing a series calculation based on the undetermined number and the plurality of coefficients,
wherein:
the execution circuit has at least one multiplier for calculation of exponentiation values of the undetermined number, and at least one multiply-and-accumulate unit combining the coefficients, the undetermined number and the exponentiation values calculated by said at least one multiplier for the series calculation.

2. The microprocessor as claimed in claim 1, wherein:
the execution circuit uses multiple stages of logic circuits to implement pipelining operation;
a first-stage logic circuit in the execution circuit uses a first multiplier to generate a first exponentiation value of the undetermined number; and
the first exponentiation value is fed to one of a plurality of multiply-and-accumulate units of a second-stage logic circuit in the execution circuit.

3. The microprocessor as claimed in claim 2, wherein:
the first exponentiation value is fed to a main multiply-and-accumulate unit of the plurality of multiply-and-accumulate units of the second-stage logic circuit; and
all outputs of all multiply-and-accumulate units of the first-stage logic circuit are fed to the main multiply-and-accumulate unit of the second-stage logic circuit.

4. The microprocessor as claimed in claim 2, wherein:
the first exponentiation value is also fed to a second multiplier in the second-stage logic circuit to generate a second exponentiation value of the undetermined number.

5. The microprocessor as claimed in claim 4, wherein:
the second exponentiation value is fed to one of a plurality of multiply-and-accumulate units of a third-stage logic circuit in the execution circuit.

6. The microprocessor as claimed in claim 5, wherein:
the second exponentiation value is fed to a main multiply-and-accumulate unit of the plurality of multiply-and-accumulate units of the third-stage logic circuit; and
all outputs of all multiply-and-accumulate units of the second-stage logic circuit are fed to the main multiply-and-accumulate unit of the third-stage logic circuit.

7. The microprocessor as claimed in claim 1, wherein:
the execution circuit includes multiple stages of logic circuits to implement pipelining operation;
coefficients regarded as a first coefficient set for a first set of terms of the series are distributed to all multiply-and-accumulate units of a first-stage logic circuit in the execution circuit; and
coefficients regarded as a second coefficient set for a second set of terms of the series are distributed to all multiply-and-accumulate units of a second-stage logic circuit in the execution circuit except a main multiply-and-accumulate unit of the multiply-and-accumulate units of the second-stage logic circuit.

8. The microprocessor as claimed in claim 2, wherein:
the first exponentiation value is also fed to one of a plurality of multiply-and-accumulate units of the first-stage logic circuit.

9. The microprocessor as claimed in claim 1, wherein:
a destination operand of the micro-instruction corresponds a result of the series calculation, a first source operand of the micro-instruction corresponds to the coefficients, a second source operand of the micro-instruction corresponds to the undetermined number, and a third source operand of the micro-instruction corresponds to an amount of the coefficients; and
digital bits of the second source operand of the micro-instruction are divided according to the third source operand to obtain the coefficients.

10. The microprocessor as claimed in claim 1, wherein:
the execution circuit includes multiple stages of logic circuits to implement pipelining operation;
by a first multiply-and-accumulate unit in a first-stage logic circuit in the execution circuit, a coefficient $a_0$ is multiplied by $x^0$, which is a zeroth power of the undetermined number x, to get a product $a_0x^0$, a coefficient $a_1$ is multiplied by $x^1$, which is the undetermined number x, to get a product $a_1x^1$, and the product $a_1x^1$ is added to the product $a_0x^0$ to get a value $S_1$ which is $a_0x^0+a_1x^1$;
by a second multiply-and-accumulate unit in the first-stage logic circuit, a coefficient $a_2$ is multiplied by $x^0$ to get a product $a_2x^0$, a coefficient $a_3$ is multiplied by $x^1$ to get a product $a_3x^1$, and the product $a_3x^1$ is added to the product $a_2x^0$ to get a value $S_2$ which is $a_2x^0+a_3x^1$; and
by a first multiply-and-accumulate unit in a second-stage logic circuit in the execution circuit, the value $S_1$ is multiplied by $x^0$ to get a product $S_1x^0$, the value $S_2$ is multiplied by $x^2$, which is the square of the undetermined number x, to get a product $S_2x^e$, and the product $S_2x^e$ is added to the product $S_1x^0$ to get a value $S_3$ which is $S_1x^0+S_2x^2$.

11. The microprocessor as claimed in claim 10, wherein:
$x^2$ is calculated by a first multiplier in the first-stage logic circuit.

12. The microprocessor as claimed in claim 10, wherein:
by a second multiply-and-accumulate unit in the second-stage logic circuit, a coefficient $a_4$ is multiplied by $x^0$ to get a product $a_4x^0$, a coefficient as is multiplied by $x^1$ get a product $a_5x^1$, and the product $a_5x^1$ is added to the product $a_4x^0$ to get a value $S_4$ which is $a_4x^0+a_5x^1$;
by a first multiply-and-accumulate unit in a third-stage logic circuit in the execution circuit, the value $S_3$ is multiplied by $x^0$ to get a product $S_3x^0$, the value $S_4$ is multiplied by $x^4$, which is the fourth power of the undetermined number x, to get a product $S_4x^4$, and the product $S_4x^4$ is added to the product $S_3x^0$ to get a value $S_5$ which is $S_3x^0+S_4x^4$.

13. The microprocessor as claimed in claim 12, wherein:
a second multiplier in the second-stage logic circuit calculates $x^4$ according to the value of $x^2$.

14. The microprocessor as claimed in claim 12, wherein:
by a second multiply-and-accumulate unit in the third-stage logic circuit, a coefficient $a_6$ is multiplied by $x^0$ to get a product $a_6x^0$, a coefficient $a_7$ is multiplied by $x^1$ get a product $a_7x^1$, and the product $a_7x^1$ is added to the product $a_6x^0$ to get a value $S_6$ which is $a_6x^0+a_7x^1$;
by a first multiply-and-accumulate unit in a fourth-stage logic circuit in the execution circuit, the value $S_5$ is multiplied by $x^0$ to get a product $S_5x^0$, the value $S_6$ is multiplied by $x^6$, which is the sixth power of the undetermined number x, to get a product $S_6x^6$, and the product $S_6x^6$ is added to the product $S_5x^0$ to get a value y which is $S_5x^0+S_6x^6$.

15. The microprocessor as claimed in claim 14, wherein:
a third multiplier in the third-stage logic circuit calculates $x^6$ according to the values of $x^2$ and $x^4$.

16. The microprocessor as claimed in claim 1, wherein:
the execution circuit includes multiple stages of logic circuits to implement pipelining operation;
by a first multiply-and-accumulate unit in a first-stage logic circuit in the execution circuit, a coefficient $a_0$ is multiplied by $x^0$, which is a zeroth power of the undetermined number x, to get a product $a_0x^0$, a coefficient $a_1$ is multiplied by $x^1$, which is the undetermined number x, to get a product $a_1x^1$, a coefficient $a_2$ is multiplied by $x^2$, which is the square of the undetermined number x, to get a product $a_2x^2$, and the products $a_0x^0$, $a_1x^1$ and $a_2x^2$ are summed up to get a value $S_1$ which is $a_0x^0+a_1x^1+a_2x^2$;
by a second multiply-and-accumulate unit in the first-stage logic circuit, a coefficient $a_3$ is multiplied by $x^0$ to get a product $a_3x^0$, a coefficient $a_4$ is multiplied by $x^1$ to get a product $a_4x^1$, a coefficient $a_5$ is multiplied by $x^2$ to get a product $a_5x^2$, and the products $a_3x^0$, $a_4x^1$ and $a_5x^2$ are summed up to get a value $S_2$ which is $a_3x^0+a_4x^1+a_5x^2$;
by a third multiply-and-accumulate unit in the first-stage logic circuit, a coefficient $a_6$ is multiplied by $x^0$ to get a product $a_6x^0$, a coefficient $a_7$ is multiplied by $x^1$ to get a product $a_7x^1$, a coefficient as is multiplied by $x^2$ to get a product $a_8x^2$, and the products $a_6x^0$, $a_7x^1$ and $a_8x^2$ are summed up to get a value $S_3$ which is $a_6x^0+a_7x^1+a_8x^2$; and
by a first multiply-and-accumulate unit in a second-stage logic circuit in the execution circuit, the value $S_1$ is multiplied by $x^0$ to get a product $S_1x^0$, the value $S_2$ is multiplied by $x^3$, which is the cube of the undetermined number x, to get a product $S_2x^3$, the value $S_3$ is multiplied by $x^6$, which is the sixth power of the undetermined number x, to get a product $S_3x^6$, and the products $S_1x^0$, $S_2x^3$ and $S_3x^6$ are summed up to get a value $S_4$ which is $S_1x^0+S_2x^3+S_3x^6$.

17. The microprocessor as claimed in claim 16, wherein:
$x^2$, $x^3$ and $x^6$ are calculated by a first multiplier in the first-stage logic circuit.

18. The microprocessor as claimed in claim 16, wherein:
by a second multiply-and-accumulate unit in the second-stage logic circuit, a coefficient $a_9$ is multiplied by $x^0$ to get a product $a_9x^0$, a coefficient $a_{10}$ is multiplied by $x^1$ to get a product $a_{10}x^1$, a coefficient $a_{11}$ is multiplied by $x^2$ to get a product $a_{11}x^2$, and the products $a_9x^0$, $a_{10}x^1$ and $a_{11}x^2$ are summed up to get a value $S_5$ which is $a_9x^0+a_{10}x^1+a_{11}x^2$;
by a third multiply-and-accumulate unit in the second-stage logic circuit, a coefficient au is multiplied by $x^0$ to get a product $a_{12}x^0$, a coefficient an is multiplied by $x^1$ to get a product $a_{13}x^1$, a coefficient $a_{14}$ is multiplied by $x^2$ to get a product $a_{14}x^2$, and the products $a_{12}x^0$, $a_{13}x^1$ and $a_{14}x^2$ are summed up to get a value $S_6$ which is $a_{12}x^0+a_{13}x^1+a_{14}x^2$; and
by a first multiply-and-accumulate unit in a third-stage logic circuit in the execution circuit, the value $S_4$ is multiplied by $x^0$ to get a product $S_4x^0$, the value $S_5$ is multiplied by $x^9$, which is the ninth power of the undetermined number x, to get a product $S_5x^9$, the value $S_6$ is multiplied by $x^{12}$, which is the twelfth power of the undetermined number x, to get a product $S_6x^{12}$, and the products $S_4x^0$, $S_5x^9$ and $S_6x^{12}$ are summed up to get a value y which is $S_4x^0+S_5x^9+S_6x^{12}$.

19. The microprocessor as claimed in claim 18, wherein:
a second multiplier in the second-stage logic circuit calculates $x^9$ and $x^{12}$ according to the values of $x^3$ and $x^6$.

20. The microprocessor as claimed in claim 1, the execution circuit implements activation function calculations required in neural network technology.

* * * * *